(12) United States Patent
Wang et al.

(10) Patent No.: US 8,233,197 B2
(45) Date of Patent: Jul. 31, 2012

(54) PANTOGRAPH METHODS, APPARATUS AND SYSTEMS BASED ON UCR/GCR

(75) Inventors: Shen-Ge Wang, Fairport, NY (US); Zhigang Fan, Webster, NY (US)

(73) Assignee: Xerox Corporation, Norwalk, CT (US)

(*) Notice: Subject to any disclaimer, the term of this patent is extended or adjusted under 35 U.S.C. 154(b) by 921 days.

(21) Appl. No.: 12/275,036

(22) Filed: Nov. 20, 2008

(65) Prior Publication Data

US 2010/0123912 A1 May 20, 2010

(51) Int. Cl.
*H04N 1/40* (2006.01)
*H04N 1/60* (2006.01)
*G06K 15/00* (2006.01)
*G06K 9/00* (2006.01)
*H04L 9/32* (2006.01)
*B42D 15/00* (2006.01)

(52) U.S. Cl. ....... 358/3.28; 358/1.9; 358/1.14; 382/165; 713/176; 283/113

(58) Field of Classification Search ............ 358/1.9, 358/3.28, 3.06, 518, 515, 529, 1.14; 382/100, 382/135, 167, 162, 164, 165; 380/201, 203; 726/32; 705/57, 67
See application file for complete search history.

(56) References Cited

U.S. PATENT DOCUMENTS

| | | | |
|---|---|---|---|
| 4,168,088 A | 9/1979 | Somlyody | |
| 4,210,346 A | 7/1980 | Mowry, Jr. et al. | |
| 5,873,604 A * | 2/1999 | Phillips | 283/70 |
| 6,104,812 A * | 8/2000 | Koltai et al. | 380/51 |
| 6,275,302 B1 * | 8/2001 | Coleman | 358/1.9 |
| 7,070,252 B2 * | 7/2006 | de Queiroz et al. | 347/15 |
| 7,656,557 B2 * | 2/2010 | Fan | 358/3.06 |
| 7,738,143 B2 * | 6/2010 | Ishimoto et al. | 358/3.28 |
| 7,764,403 B2 * | 7/2010 | Loce et al. | 358/3.28 |
| 7,796,753 B2 * | 9/2010 | Alasia et al. | 380/51 |
| 7,869,090 B2 * | 1/2011 | Wang et al. | 358/1.9 |
| 7,894,103 B2 * | 2/2011 | Wang et al. | 358/3.28 |
| 2003/0025924 A1 * | 2/2003 | Lammens et al. | 358/1.9 |
| 2006/0012815 A1 * | 1/2006 | Ebner et al. | 358/1.13 |
| 2006/0285135 A1 * | 12/2006 | Mestha et al. | 358/1.9 |
| 2007/0086050 A1 * | 4/2007 | Matsuda | 358/1.15 |
| 2007/0091339 A1 * | 4/2007 | Matsumoto et al. | 358/1.9 |
| 2007/0091350 A1 * | 4/2007 | Aritomi et al. | 358/1.14 |
| 2007/0139520 A1 * | 6/2007 | Loce et al. | 348/60 |
| 2007/0139681 A1 * | 6/2007 | Eschbach et al. | 358/1.11 |
| 2007/0139714 A1 * | 6/2007 | McElvain | 358/3.06 |
| 2007/0146771 A1 * | 6/2007 | Silverbrook et al. | 358/1.14 |
| 2007/0177759 A1 * | 8/2007 | Eschbach et al. | 382/100 |
| 2008/0145125 A1 * | 6/2008 | Mestha et al. | 400/76 |
| 2008/0305444 A1 * | 12/2008 | Eschbach et al. | 430/495.1 |
| 2009/0207433 A1 * | 8/2009 | Wang et al. | 358/1.11 |
| 2010/0150433 A1 * | 6/2010 | Wang et al. | 382/162 |

OTHER PUBLICATIONS

U.S. Appl. No. 12/034,141, filed Feb. 20, 2008, Wang et al.

* cited by examiner

*Primary Examiner* — Madelein A Nguyen (74) *Attorney, Agent, or Firm* — Fay Sharpe LLP (57) ABSTRACT

The disclosure provides pantograph methods, apparatus and systems. Specifically disclosed is a method of rendering a pantograph including defining a foreground region associated with a pantograph, defining a background region associated with the pantograph, and applying a first UCR/GCR strategy to the background region and a second UCR/GCR strategy to the foreground region, whereby the foreground region is less discernable after the pantograph is rendered with a printing device relative to a reproduction of the rendered pantograph.

20 Claims, 8 Drawing Sheets

PANTOGRAPH METHODS, APPARATUS AND SYSTEMS BASED ON UCR/GCR

CROSS REFERENCES TO RELATED PATENTS AND APPLICATIONS

U.S. patent application Ser. No. 12/034,141, filed Feb. 20, 2008, by Shen-Ge Wang, Reiner Eschbach and Peter S. Fisher, entitled: "VARIABLE DATA DIGITAL PANTOGRAPHS"; U.S. patent application Ser. No. 12/336,601, filed Dec. 17, 2008, by Shen-Ge Wang, Reiner Eschbach, William A. Fuss, Farzin Blurfrushan and Ed Chapman, entitled: "VARIABLE DATA DIGITAL PANTOGRAPHS"; "Device Characterization", by R. Bala, Chapter 5, Digital Color Imaging Handbook, Gaurav Sharma Ed., CRC Press, 2003; "Design of UCR and GCR Strategies to Reduce Moire in Color Printing", by R. Balasubramanian et al., IS&TPICS Conference, pp. 390-393 (1999); and "Reducing Multi-Separation Color Moire by a Variable Undercolor Removal and Gray Component Replacement Strategy", by R. Balasubramanian et al., Journal of Imaging Science & Technology, vol. 45, no. 2, pp. 152-160, March/April, 2001, are incorporated totally herein by reference in their entirety.

BACKGROUND

This disclosure relates to the protection of documents. It finds particular application in connection with a method for incorporating data in documents which become visible when the document is copied.

As the quality of color copiers has improved, it has become easier to generate copies of a document which are indistinguishable from the original document. In many instances, the unauthorized copying of document content can have serious implications. For example, there is a concern that color copiers could be used to reproduce security documents, such as checks, stock certificates, automobile title instruments, and other documents of value, for illegal purposes.

One method which is used to authenticate documents and to reduce the unauthorized copying employs what is commonly called the VOID-pantograph. Common techniques for creating pantographs involve forming printed dots, or other elements, of two different sizes and frequencies, which are used to create regions of similar tone, corresponding to a textual warning and background, respectively, in an original (authentic) document. Tone refers to the visual appearance produced by halftone dots, bars, or marks which cover at least a portion of a printed area and which usually have a frequency that is measured in dots, lines, or marks per inch. To provide constant tone, the smaller elements have a higher frequency than the larger elements. Because the tone of the textual warning and the tone of the background pattern are selected to be substantially the same, these two regions have a similar visual impact on an observer of the original document, and the textual warning is not readily perceived.

On copying, however, the situation changes. Since the response of an image sensor employed in the scanner is different from the response of the human visual system, changes in the relative tone of the two different areas will appear. These changes are due to the different frequency response of the sensor with respect to the human eye and also due to other, normally non-linear, effects, such as a detection floor or threshold, where signals below a certain level are simply "lost." In general, the high frequency components are more strongly affected and attenuated. The difference in response of the scanner expresses itself as a relative change in tone in the copy and thus the hitherto invisible textual warning becomes visible. For example, in the resulting copy, only the larger printed dots are apparent. These larger dots spell out the word "void," or other pre-determined textual warning.

In current techniques, the pantograph is applied to the substrate to create a pre-printed carrier. An image to be protected is then applied to the pre-printed carrier.

These methods have generally been successful in protecting documents, and are sometimes combined with other techniques, such as the use of camouflage patterns, and the like. However, they are static in nature and thus in general are limited to generally valid, partly nondescript words like "void" or "copy."

There remains a need for other systems and methods for the creation of pantographs.

INCORPORATION BY REFERENCE

The following references, the disclosures of which are incorporated herein in their entireties by reference, are mentioned:

U.S. Pat. No. 4,168,088 issued Sep. 18, 1979, entitled PROTECTED DOCUMENT AND METHOD OF MAKING THE SAME, by Somlyody, discloses document for preventing unauthorized copying having on a top surface, background printed matter made up of small areas of substantially the same size and shape. A warning word is printed on the top surface and blended with the background printed matter. The warning word is made up of small areas of substantially the same shape as the background but of a different size such that the warning word cannot be detected by a viewer, but will be visible upon reproduction by a copying machine.

U.S. Pat. No. 4,210,346, issued Jul. 1, 1980, entitled PROTECTED DOCUMENT BEARING WATERMARK AND METHOD OF MAKING, by Mowry, Jr. et al., discloses security document adapted for use with a xerographic color copier having a lens reproduction system which has a reproduction density threshold which at normal operator accessible copier settings reproduces dots of a tone density which are larger than the reproduction density threshold and which does not resolve and consequently does not reproduce dots of a tone density which are smaller than the threshold. The document includes a substrate and a security background printed on the substrate which includes a warning mark composed of a dot pattern of a plurality of relatively large dots patterned so as to comprise the warning mark. The pattern is surrounded by a plurality of spaced small dots. The dots are registered so as to be in phase with the large dots being spaced a distance which is a multiple of the distance between the small dots. The large dots and small dots are aligned as a parallel screen with the pitch of the smaller dots being twice the pitch of the large dots. The large dots and smaller dots are camouflaged by a camouflage overlay pattern printed as a visually confusing and obscuring pattern.

U.S. Pub. No. 20070139681, published Jun. 21, 2007, entitled PRINTED VISIBLE FONTS WITH ATTENDANT BACKGROUND, and U.S. Pub. No. 20070139680, published Jun. 21, 2007, entitled VARIABLE DIFFERENTIAL GLOSS FONT IMAGE DATA, both by Reiner Eschbach, et al., disclose methods for supplying differential gloss or other correlation mark text into a document image via a font definition, particularly as when desired in the employ of rendering variable data. A font character is selected and sub-sampled. The sub-sampled result is then scaled up into a full size result. A first halftone cell having a first anisotropic structure orientation is selected and applied to the full size scaled font result while a second halftone cell having a second anisotropic structure orientation is applied to the surrounding background around the full size scaled font result to create a gloss font or other correlation mark character. This full gloss font character or correlation mark character is then stored as a font representation as callable by the digital front end of a printing apparatus.

BRIEF DESCRIPTION

In accordance with one aspect of the exemplary embodiment, a method of rendering a pantograph is disclosed. The method comprises a) defining a foreground region associated with the pantograph; b) defining a background region associated with the pantograph, the background region suitably sized and arranged for encompassing the foreground region; c) selecting a target color for rendering the foreground region and background region of the pantograph; d) applying a first UCR/GCR strategy to the background region for rendering the target color within the background region, and applying a second UCR/GCR strategy to the foreground region for rendering the target color within the foreground region whereby the foreground region is less discernable after the pantograph is rendered with a printing device relative to a reproduction of the pantograph rendered with the printing device; and e) rendering the foreground region and background region on the printing device.

In accordance with another aspect of the exemplary embodiment, a computer program product is disclosed. The computer program product comprises a computer-usable data carrier storing instructions that, when executed by a computer, cause the computer to perform a method comprising receiving a data representation of a pantograph, the pantograph including a foreground region and a background region suitably sized and arranged for encompassing the foreground region; and applying a first UCR/GCR strategy to the background region for rendering a target color within the background region, and applying a second UCR/GCR strategy to the foreground region for rendering the target color within the foreground region, whereby the foreground region is less discernable after the pantograph is rendered with a printing device relative to a reproduction of the pantograph rendered with the printing device.

DETAILED DESCRIPTION

The following detailed description provides methods, apparatus and systems for the creation of pantographs described. Furthermore, the following detailed description makes reference to the accompanying drawings, which form a part hereof, and which are shown by way of illustration embodiments in which the disclosed methods, apparatus and systems can be practiced. These exemplary embodiments are described in sufficient detail to enable those of ordinary skill in the art to practice the embodiments, and it is to be understood that other embodiments may be utilized without departing from the scope of the disclosure.

Substantively, a pantograph according to this disclosure includes two regions: a first region, which can be considered as the foreground region having an image shape, and a second region or background region, which constitutes a field area that is suitably sized and arranged for encompassing the image shape. The foreground and background regions are abutting and are rendered using two distinct UCR/GCR strategies which provide similar tone to the regions in an original document but which respond differently to copying such that differences in tone then become apparent, making the foreground region visible.

For a 4-color printer using CMYK (Cyan, Magenta, Yellow, and Black) toner/ink, black or gray color can be produced by using either K toner/ink, or a combination of CMY.

In general, there are many advantages to replace black toners for the CMY equivalent. For example, having relatively more black in a printed image costs less, provides better stability to the printed image in the presence of variables such as relative humidity, temperature, material latitude, etc. In addition, a printer can render a broader gamut of dark colors. However, using too much black toner may cause more halftone noise and roughness in picture. The UCR/GCR (Under Color Removal/Gray Component Replacement) is a procedure that determines the amount of black/gray to be printed with K vs. CMY. A more aggressive UCR/GCR strategy may apply more K toner, while a more conservative strategy use more CMY. Different UCR/GCR strategies provide not only controls over image quality, but also possibilities for special functions.

In R. Bala, "Device Characterization", Chapter 5, Digital Color Imaging Handbook, Gaurav Sharma Ed., CRC Press, 2003, several methods for determining the black (K) component are reviewed. One method is black addition in which the black (K) component is calculated as a function of a scaled inverse of $L^*$. In another method, the black (K) component is calculated as a function of the minimum value of the other color components, such as C, M, and Y for the CMY color space. In a third method, a three input-four output transform, subject to imposed constraints, is used to calculate the black (K) component. The constraints placed on the transform include requiring the sum of the color component values at a node to be less than a threshold. For example, in CMYK color space, C+M+Y+K. would be constrained to be less than a threshold. A second constraint is to constrain K to be a subset of the range between the minimum and maximum allowed K values.

Another method is discussed in R. Balasubramanian, R. Eschbach, "Design of UCR and GCR Strategies to Reduce Moire in Color Printing", IS&TPICS Conference, pp. 390-393 (1999) and R. Balasubramanian, R. Eschbach, "Reducing Multi-Separation Color Moire by a Variable Undercolor Removal and Gray Component Replacement Strategy", Journal of Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

For purposes of illustration, the exemplary embodiment described herein will address the application of multiple GCR strategies to produce a pantograph, however, it is to be understood multiple UCR strategies can also be applied to produce pantographs as disclosed.

Figure 1:
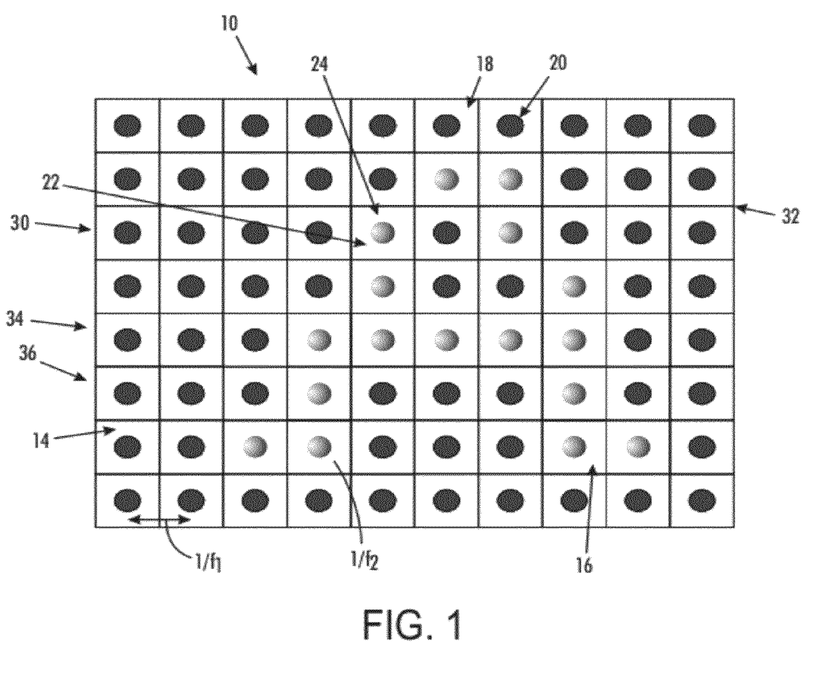
FIG. 1 is a greatly enlarged view of a pantograph character representation suitable for use in creation of a pantograph in accordance with a first aspect of the exemplary embodiment.
Figure 2:
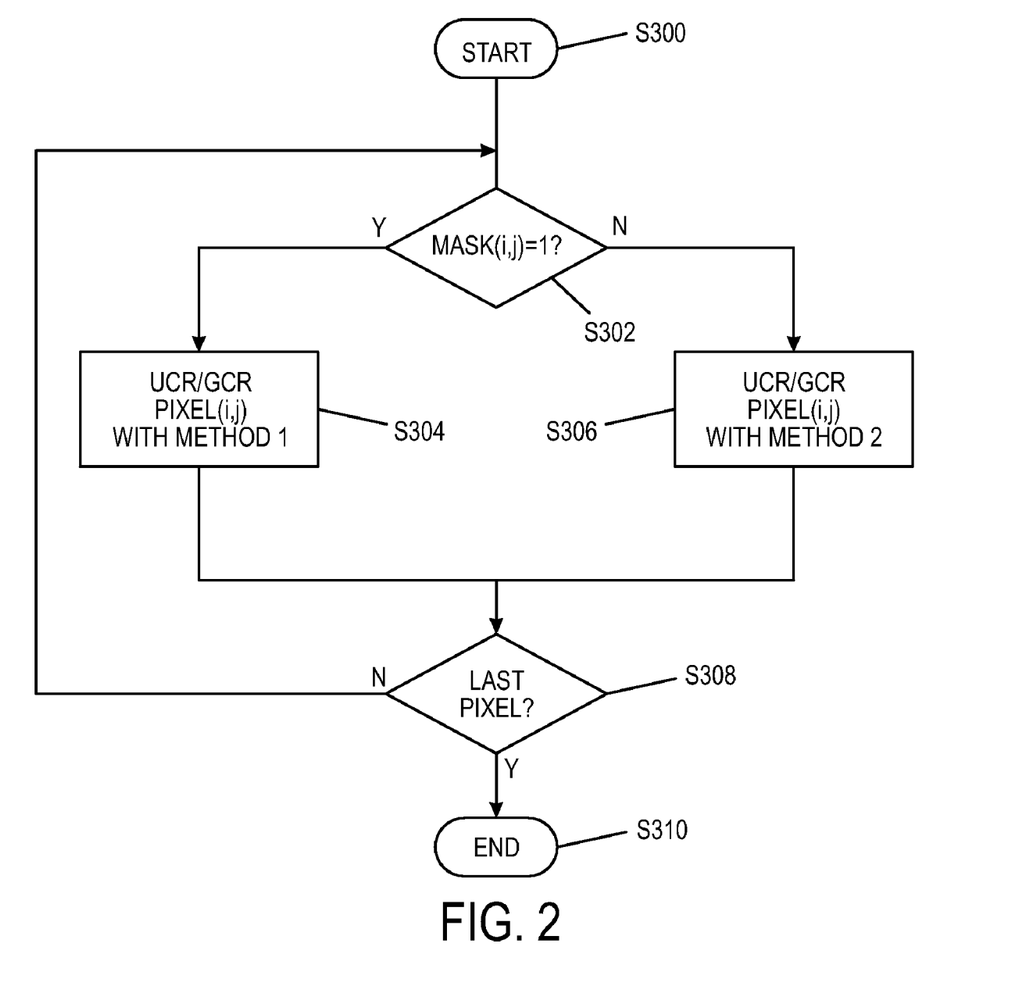
FIG. 2 illustrates a method for the creation of the pantograph character of FIG. 1.
Figure 3:
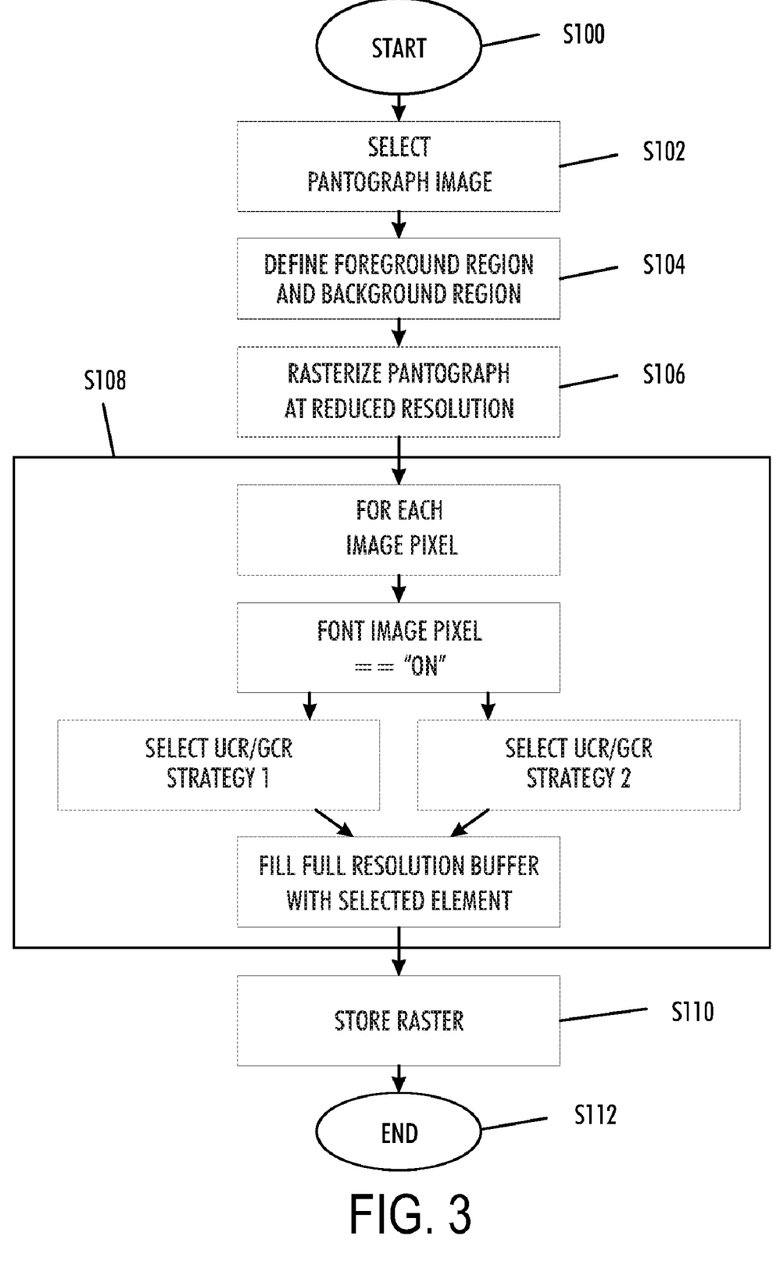
FIG. 3 illustrates a method for the creation of the character representation of FIG. 5.
Figure 4:
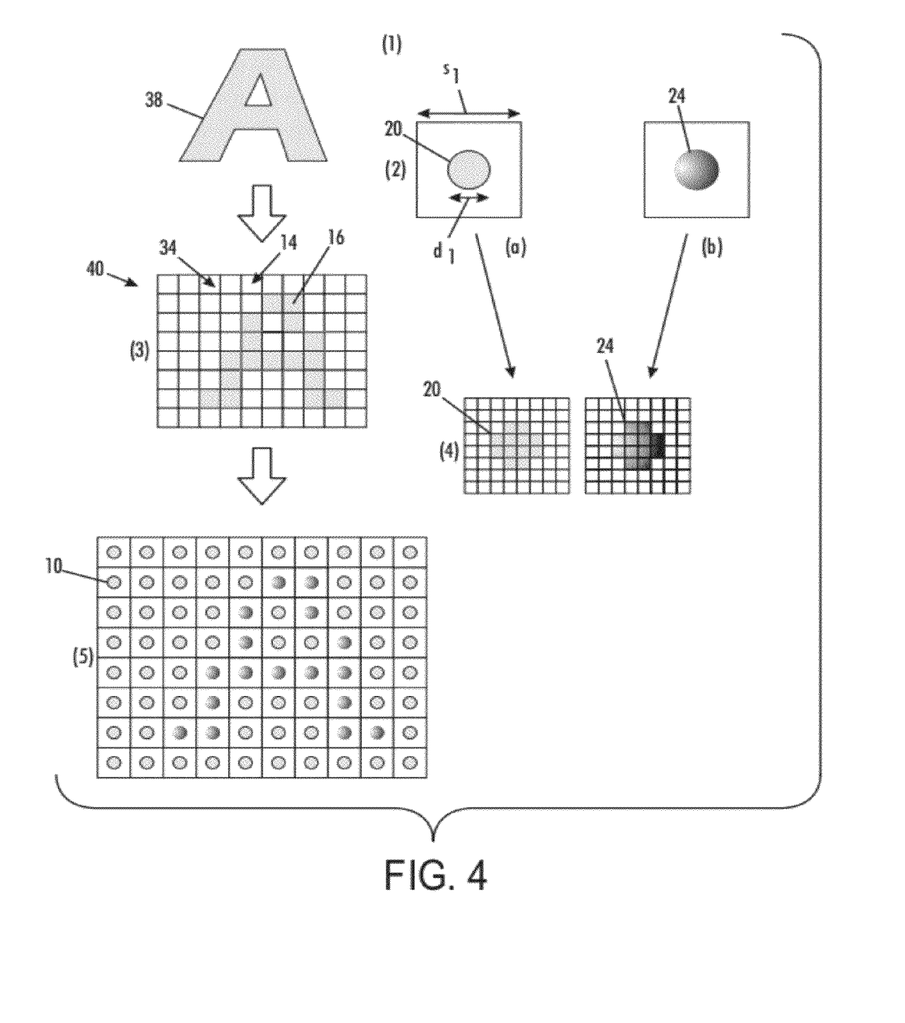
FIG. 4 graphically illustrates some of the steps in the method of FIG. 3.

FIG. 1 depicts an exemplary character representation 10 (here illustrated as a representation of the letter A) which can be produced by the method shown in FIGS. 2, 3 and 4. Such a character representation 10 can be stored in memory for subsequent retrieval and assembly with other character representations to form a pantograph 12 of the type shown in FIG. 4.

The character representation 10 includes a background region 14, which forms a field area, and a foreground region 16, entirely contained therein and contiguous therewith. The union of background and foreground regions 14, 16 may be of any suitable shape, such as rectangular, hexagonal, or the like which permits a sequence of character representations to be seamlessly arranged in any desired order for rendering as a void pantograph. For convenience, rectangular shapes are employed for the background 14. The foreground region 16 has a shape which corresponds generally to that of a character to be represented by the character representation 10. As will be appreciated from the following description, the terms "foreground region" and "background region" are used for convenience to identify two regions of a character representation which are of similar tone but which respond differently to copying and are not intended to imply that the regions are distinguishable in an original document or that they need to be stored as separate elements in a data structure.

A pattern 18 of elements 20 is applied in the background region 14 with a first GCR strategy to fill the background region and a pattern of elements is applied in the foreground region 16 with a second GCR strategy to fill the foreground region. The pattern 18 may be formed from dots, lines, or other elements 20, 24. The dots may be as described in U.S. Pat. No. 4,210,346, and the arrangements of dots can be created by a design process, as described in further detail below The foreground region 16 has a similar tone to the background region 14. In particular, the background region and foreground region have elements 20 of a size which may be expressed, for example, as an object size or as the number of pixels in a halftone structure and a spacing $s_1$ where $s_1=1/f_1$ and $f_1$ is the frequency, which may be expressed as elements 20 per unit length. It is to be understood that "unit length" is replaced by "unit area" for the actual 2-dimensional case. In one embodiment, the elements differ in color while still providing a visibly similar or identical tone in the original document. In some embodiments, any slight variations in tone are masked by introducing a distraction pattern, or camouflage, as disclosed in above-mentioned U.S. Pat. No. 4,210,346, incorporated by reference.

In the exemplary embodiment, the elements 20, 24 of the two regions 14, 16 are simultaneously encapsulated inside the character representations 10. The entire character representation can thus be stored as a single data set. The rendering system is thus not aware of the foreground/background distinction which is described herein primarily for purposes of human understanding. To the rendering system, a rectangular area is simply rendered containing two regions with distinct GCR strategies incorporated therein.

The elements 20, 24 respond differently to copying, such that in a copied document, the regions 14, 16 are no longer of similar tone but differ in tone. As a result, a copy of the original document made on a color copier displays a cancellation term.

In the exemplary embodiment, the character representation 10 is defined by an imaginary n×m grid 34 in which each square 36 of the grid has one of two dots assigned to it wherein the dots 20, 24 are entirely contained within the respective grid square. Moreover, the two dots are similar in tone and are produced using distinct GCR strategies. As will be appreciated, in FIG. 1, the grid lines are shown for clarity only and are not a part of the stored character representation 10. In this way, according to one embodiment, all characters can be created as individual character representations 10 and embedded as a pantograph font and can be requested using standard workflow mechanisms.

With reference to FIG. 2, illustrated is an exemplary method of generating a pantograph using a first and second GCR strategies according to an exemplary embodiment.

The method operates as follows:

Initially, an image is rasterized to produce a collection of pixels representing each character block within each character block, the background region pixels are associated with a mask=1, i.e., mask (i,j)=1, and the foreground region pixels are associated with a mask=0, i.e., mask (i,j)=0.

To apply the distinct GCR strategies, the routine starts S300 and the mask associated with a specific pixel with the character block is screened OS302 to determine if the mask is equal to 1 or 0.

If the mask=1, S304 applies a first GCR method to pixel (i,j,j), if the mask=0, S306 applies a second GCR method to pixel (i,j).

Then the routine determines if all pixels have been processed at S308, if not, the routine returns to S302 to process another pixel associated with the character block, otherwise the routine ends at S310 after all pixels associated with the character block have been processed whereby one of two GCR strategies are applied to the pixels.

FIGS. 3 and 4 illustrate one embodiment of a method for creating a character representation 10 of the type shown in FIG. 1. It is understood that some of the steps of the method do not need to be performed in the order illustrated and may be parallelized, interchanged, or new or different steps employed. The method begins at S100.

As will be appreciated, the elements 20, 24 are shown much larger in FIG. 4 than the elements will appear in the printed document.

Initially, the method starts at S100.

Then, at S102, the method selects a pantograph image for rendering.

Next, the method defines a foreground region and a background region which all embody the selected pantograph.

At S106, for each character 38 to be represented as a character representation 10, the character is rasterized to form a rasterized character image 40. The rasterizing is generally performed at a reduced resolution from that normally used for the character 38. For example, as shown at (3) in FIG. 4, the character image "A" is rasterized in a 10×8 pixel grid, although larger or smaller grids are also contemplated. In general, a reduction in resolution by at least a factor of three in each dimension is convenient, and in one embodiment, a factor of at least four, such as about eight may be used. Thus, for example, a character "A" which is generally stored as an 80×64 pixel data structure in a given font representation may be readily reduced to a 10×8 pixel grid by combining a block of 64 pixels into one pixel of the grid.

The purpose of the rasterization is to create a grid of pixel locations 36 (here rectangles) which are each large enough to receive one of the GCR dependent dot elements 18, 22, and thus the reduction in resolution may vary, depending, for example, on the pixel size of the original character 38 and the rendering capabilities of the printer, and so forth.

Figure 6:
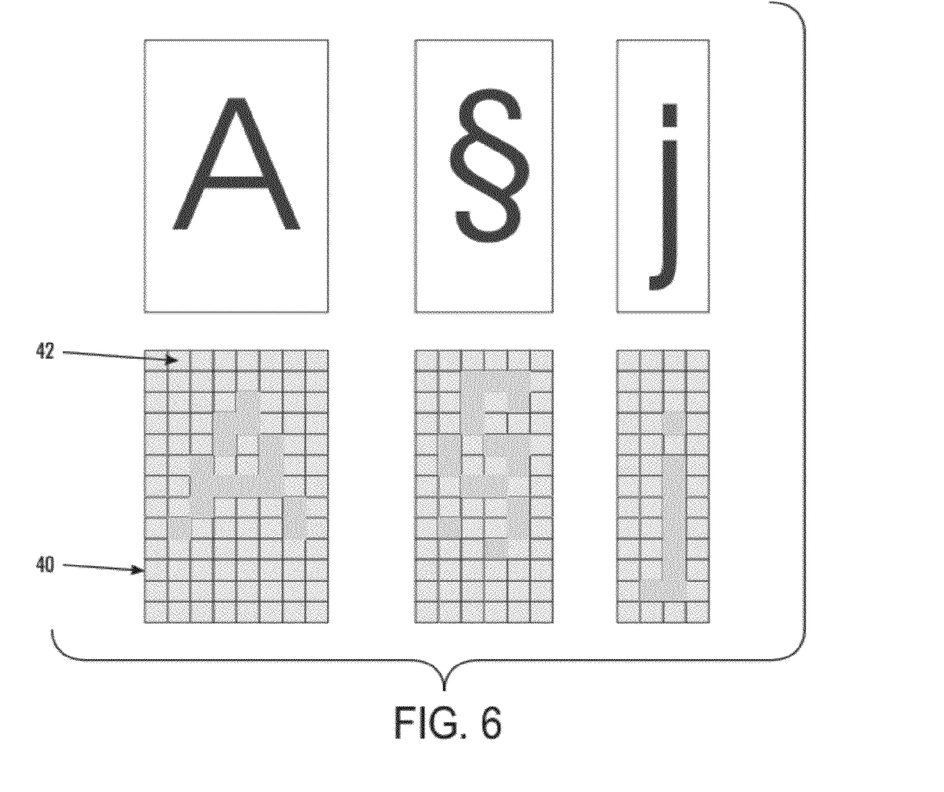
FIG. 6 illustrates three different rasterized characters.

With reference now to FIG. 6, which shows by way of example, grids 34 for the characters A, §, and j, the pixel height of the grid (13 pixels in the exemplary embodiment) may be a constant for all character representations in the selected pantograph representation.

At this stage, the rasterized character images 40 in the set typically still have a human-recognizable form. Each pixel location in the grid 34 can assume one of two states, "ON" or "OFF." For simplicity in FIGS. 4 and 6, the character pixels are described by "OFF" for the background and "ON" for the foreground (character). As will be appreciated, steps S102-S104 can be performed in advance for all characters in the set. The actual character image 40 is then retrieved from memory at S106.

Returning once more to FIG. 3, at S108, each character image pixel in the "OFF" state is replaced with the first color dot according to a first GCR (a) and every pixel in the "ON" state is replaced with the second color dot according to a second GCR (c). See, for example at (5) in FIG. 4. At S110, the character raster image 10 is then stored inside the new pantograph at the logical location of the input character in the input font.

The method ends at S112.

It should be noted that the pantograph character 38 is rasterized to the reduced resolution in a way that the combination of the lower resolution with the base pattern size results in the intended size at print resolution. Although more elaborate graphical characters can be used, it is generally more effective if a simpler visual representation of the logical character is employed. For simplicity, the rasterization effect illustrated at (4) is not shown in (5).

The result has intended print resolution, since the pantograph will be rendered at print resolution. This conversion to higher resolution might be performed at this step by rasterizing the graphic description of the pantograph.

As will be appreciated, more than one pantograph representation 10 may be stored. Additionally pantograph representations may be stored for different character sizes or font styles. For example, character representations may be separately stored for font size 36 point and font size 96 point and character representations may be separately stored for generating pantographs with character representations similar to Times New Roman and Arial characters. Each of the plural character representations may be individually tailored to maximize the blending of foreground and background regions so that they appear similar in tone.

The character representation 10 may be stored in any convenient format. A suitable character representation format is one that that is efficiently handled by a DFE (Digital Front End) such as DocuSP® that uses the font in a variable data application such as VIPP® (Variable Data Intelligence Postscript Printware) and other various document management software, such as FreeFlow™.

In one embodiment, the elements 20, 24, when rendered on print media, may be less than 1 mm in size, e.g., average diameter, such as about 0.3 mm or less. The elements 20 may have a size (e.g., number of pixels) which is at least twice that of elements 24, or vice versa.

In yet other embodiments, the character representations 10 are stored as bitmaps similar to grid 40.

Figure 5:
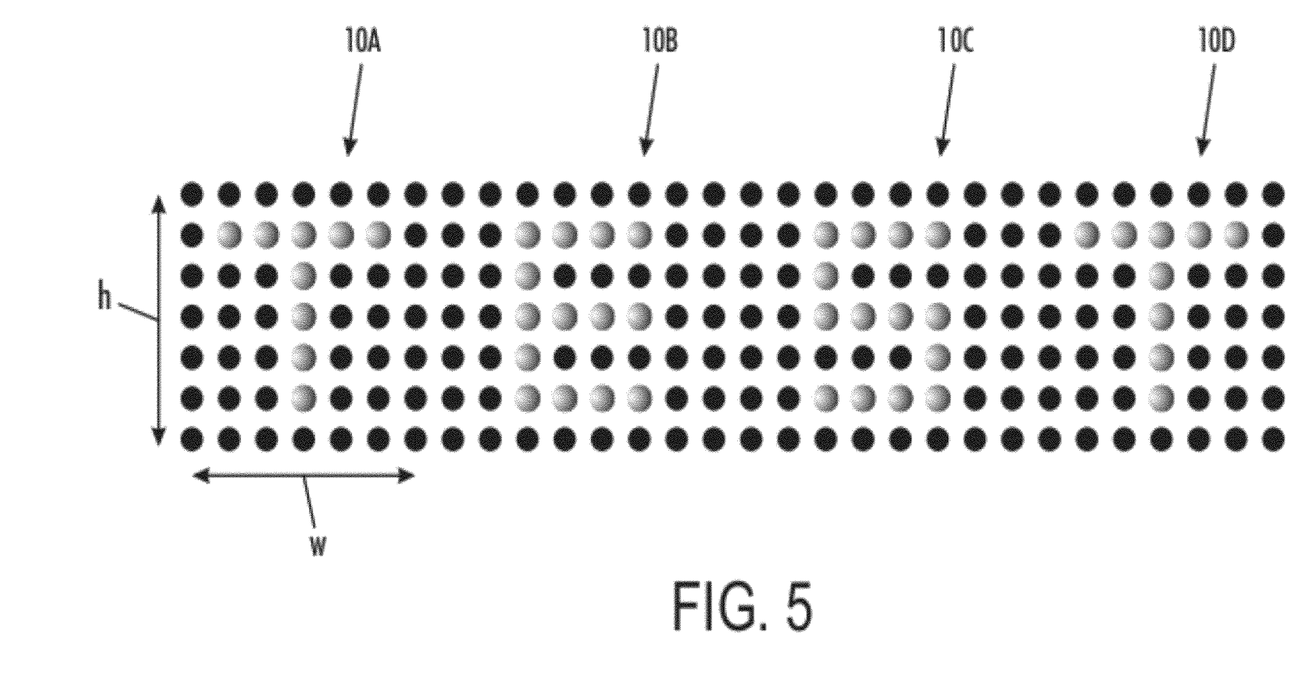
FIG. 5 illustrates an exemplary pantograph which may be generated by the character representations of the type shown in FIG. 1.

As shown in FIG. 5, a pantograph 12 may be generated by combining two or more of the stored character representations 10. In FIG. 5, four character representations 10A, 10B, 10C, and 10D are arranged in sequence to represent the word TEST, by way of example, although the possibilities are virtually limitless. The background region 14 for each of the character representations 10A, 10B, 10C, and 10D may be of the same height h as that of the other character representations in the same font representation in the stored finite vocabulary. Different font representations may have a different height h. The height h may be an integer multiple of the pattern spacing for periodicity reasons. For example, if the background pattern 18 is the coarser of the two patterns, the height h may be an integer multiple of that periodicity. This requirement guarantees that two lines of text vertically abutting will do so without a visual artifact at the boundary location. The background region may similarly have a width w that is a function of the size of the grid elements 36. For different characters, different character widths w may be appropriate, as shown in FIG. 6. This may be described as a toroidal symmetry requirement for each character representation.

In the illustrated embodiment, each character representation 10A, 10B, 10C, and 10D corresponds to a single character 38, such as a letter, but it can readily be envisaged that a character representation may be stored which includes several foreground regions 16, each representing a different letter. For example, one character representation could be stored in memory corresponding to the entire word VOID. Additionally, to provide spaces between words one or more "blank" representations may be stored which each includes the background (or foreground) region only.

As with conventional void pantographs, the pantograph 12 illustrated in FIG. 5 may be utilized, for example, to provide security information for a ticket, coupon, or the like, to provide an indicia as to the source of the image, to provide personalized information in mass mailings, or to provide time varying information, such as a date on which the image is printed, and may include job processing/integrity numbers, bar-codes, company trademarks or logos, or the like. Variable data pantographs applied to such uses discourages falsification or fraud while serial numbers or other changing characters allows for tracking. In one embodiment, a variable data string is generated as a function of the IP address or other information identifying the workstation/user sending the original document to a printer such that an unauthorized copy of the document can be traced back to the person who printed the original document. For example, the simple "VOID" message can be implemented with character representations which provide tracking information, such as "This document leaked by J. Doe".

The character representation 10 has an associated color, upon which the standard color operations can be performed. In general, foreground and background regions 14, 16 have the same color. This means that in most cases the character representation 10 will have but a single color. For example, in the rendered document, both the foreground and background regions may be formed with the same color separation, such as cyan, magenta, cyan, or yellow. By selection of similar size and discrete GCR dot elements 20, 24 which yield similar tone in an original document, as viewed by the unaided eye of a casual observer, variable data can be easily incorporated by retrieving the stored character representations and assembling them in a selected arrangement.

Figure 7:
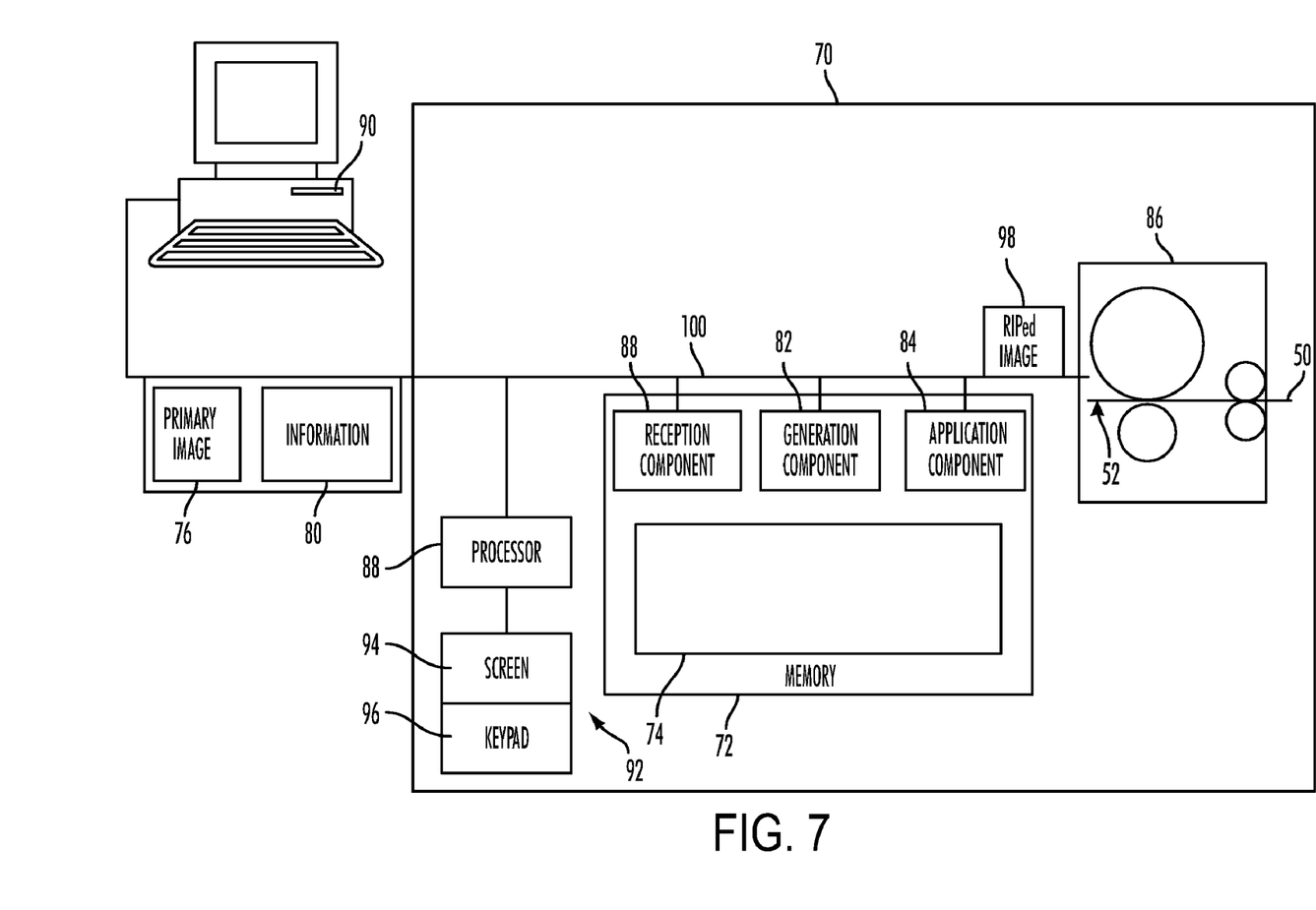
FIG. 7 illustrates a system for incorporating a pantograph in an original document, in accordance with a second aspect of the exemplary embodiment.

As illustrated in FIG. 7, a printing apparatus 70 is provided having electronically stored, e.g., in memory 72, pantograph representations accessible to the printing apparatus. The character representations 10 (here illustrated as character representations 1 and 2) can be retrieved and assembled in any desired arrangement, to form a pantograph 12 which is rendered along with an image 76, onto a substrate 52 to form an original document 50. The printing apparatus may include a reception component 78 which receives information 80 concerning a data string to be represented as character representations, and a generation component 82 for retrieving the selected data character representations 10 from memory 72, based on the received information 80, and assembling them in an arrangement in accordance with the received information. The information 80 received by the reception component 78 may include the data string to be represented such as the sequence of characters of the word VOID, or the reception component 78 may receive the data string from another source, based on the information 80. The generation component 82 may generate the pantograph 12 of character representations in order to form a pattern of such pantographs over at least a portion of the original document 50 or over the entire document 50. In other embodiments, only a small area of the image 76 is targeted for incorporation of the variable data pantograph 12. An application component 84 incorporates the variable data pantograph 12 into the image data 76 to form binary image data for rendering on a marking device or "printer" 86.

Reception component 78, generation component 82, and application component 84 may be embodied in software, hardware, or both. In the exemplary embodiment, these are software components comprising processing instructions stored in memory, such as memory 72 or a separate memory, and which are executed by an associated processor 88. Components 78, 82, and 84, as well as memory 72 and processor 88, each may be local to the printing apparatus, as shown, or remote therefrom.

In the illustrated embodiment, the processor 88 is resident in the printer's digital front end, or DFE. A primary image 76 may be received as input data to the processor 88 as is normal. For example, the image 76 may be transferred from a remote workstation 90 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. The primary image data 76 may include image data for one or more color channels, e.g., in a portable document format. During processing, the primary image data 76 may be stored in memory 72, which is accessible to the processor 88.

A printing apparatus, as used herein can include any device for rendering a dynamically variable image on print media, such as a laser printer or a multifunction machine having copying and/or faxing as well as printing capability. "Print media" can be a physical sheet of paper, plastic, or other suitable physical print media substrate for images. The original document 50 can be a single sheet or set of related sheets generated from electronic document page images, from a particular user, or otherwise related, and the exemplary digital pantograph. An image generally may include information in electronic form which is to be rendered on the print media by the printer and may include text, graphics, pictures, and the like. The operation of applying images to print media, for example, graphics, text, photographs, etc., is generally referred to herein as printing or marking. While in the exemplary embodiment, the printing apparatus 70 is described in terms of a xerographic printer, it is also contemplated that the printer may incorporate inkjet or other marking technology.

Information 80 may accompany the image 76 in the form of a job ticket, which provides the instructions for generating the pantograph 12. Alternatively, at least some of the instructions 80 may be embedded in the image 76, for example, using HTML or XML tags. The instructions 80 may include parameters of a data string to be incorporated, such as one or more of the letters or other characters which are to make up the pantograph, the order in which they are to appear in the string, the location(s) of the pantograph 12 with respect to the primary image 76, or repetition pattern or other arrangement of the data string on the page, as well as the color(s) to be used in rendering the data string. Alternatively, one or more of the parameters of the pantograph 12 may be selected at the printing apparatus 70 or be stored in memory 72 at the printing apparatus or be received in a file along with the incoming primary image data.

In one embodiment, the generation component 82 generates the pantograph based on the source 90 of the information, such as the name of the workstation user. For example, the generation component 82 may configure the variable data string in the general form "printed by X" where X is the name of the workstation user, which is provided by information 80.

In another embodiment, a user selection device 92, in communication with the processor 88 allows a user to provide information 80. The exemplary user selection device 92 includes a screen 94, which displays a graphical user interface, and an associated input device 96, such as a keyboard, keypad, touch screen, and/or cursor control device, which allows a user to select characters to form variable data strings, for example, by typing a text string on the keyboard 96. For example, the user may type the variable data string "No copying without authorization of Jane Doe," which is to be used to form the pantograph 12. In one embodiment, the user can view a representation of the pantograph 12, superimposed on the image 76, on the screen 94. The representation of the pantograph may illustrate the cancelled term which will appear when the document is copied, rather than replicating the pantograph exactly. The user can then determine whether the pantograph is properly located, with respect to the image 76. In one embodiment, the user can change parameters, such as the pantograph's location, size, repetition frequency, color, UCR/GCR strategies or the like via the input device 96. As will be appreciated, each of these operations may alternatively take place at a location remote from the printer, such as at the workstation 90. In one embodiment, a user interface similar to that disclosed in U.S. Pub. No. 20060127117, published Jun. 15, 2006, entitled USER INTERFACE FOR DIFFERENTIAL GLOSS IMAGES, by Reiner Eschbach, et al., may be employed as the user selection device 92. The user is instructed to indicate the base primary image data, and the characters forming the desired pantograph 12. This data may be displayed for verification and position adjustment by superimposition of the representation of the pantograph upon the base image data.

In combining the data 12 with the image data 76, a single target color may be selected for the variable data, which is different from the rest of the image.

In one embodiment, the image data 98 thus formed which includes the pantograph 12 and optionally image 76, such as text, graphics, or the like, may be stored as a digital image data file to be rendered by the same or a different printer or marking device from the printing apparatus creating the digital image file. For example, the image data file may be stored for later rendering on a printer which does not have software and/or hardware for embedding pantographs in images.

The exemplary processor 88 executes instructions 78, 82, 84, stored in memory for performing the method outlined in FIG. 10. The processor 88 may be embodied as hardware, software or both and may be hosted by any suitable computing device, such as a PC, such as a desktop, a laptop, palmtop computer, portable digital assistant (PDA), cellular telephone, pager, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. Components of the apparatus may communicate via a data control bus 100.

The memory 72 may represent any type of computer readable medium such as random access memory (RAM), read only memory (ROM), magnetic disk or tape, optical disk, flash memory, or holographic memory. In one embodiment, the memory 72 comprises a combination of random access memory and read only memory. In some embodiments, the processor 88 and memory 72 may be combined in a single chip. In one embodiment, memory 72 stores instructions executed by the processor 88 for performing the exemplary method as well as the vocabulary 74 and processed image data 98.

While particular reference is made to electrophotographic (e.g., xerographic) printers, suitable printers 86 may also include ink-jet printers, including solid ink printers, thermal head printers that are used in conjunction with heat sensitive paper, and other devices capable of marking an image on a substrate.

Figure 8:
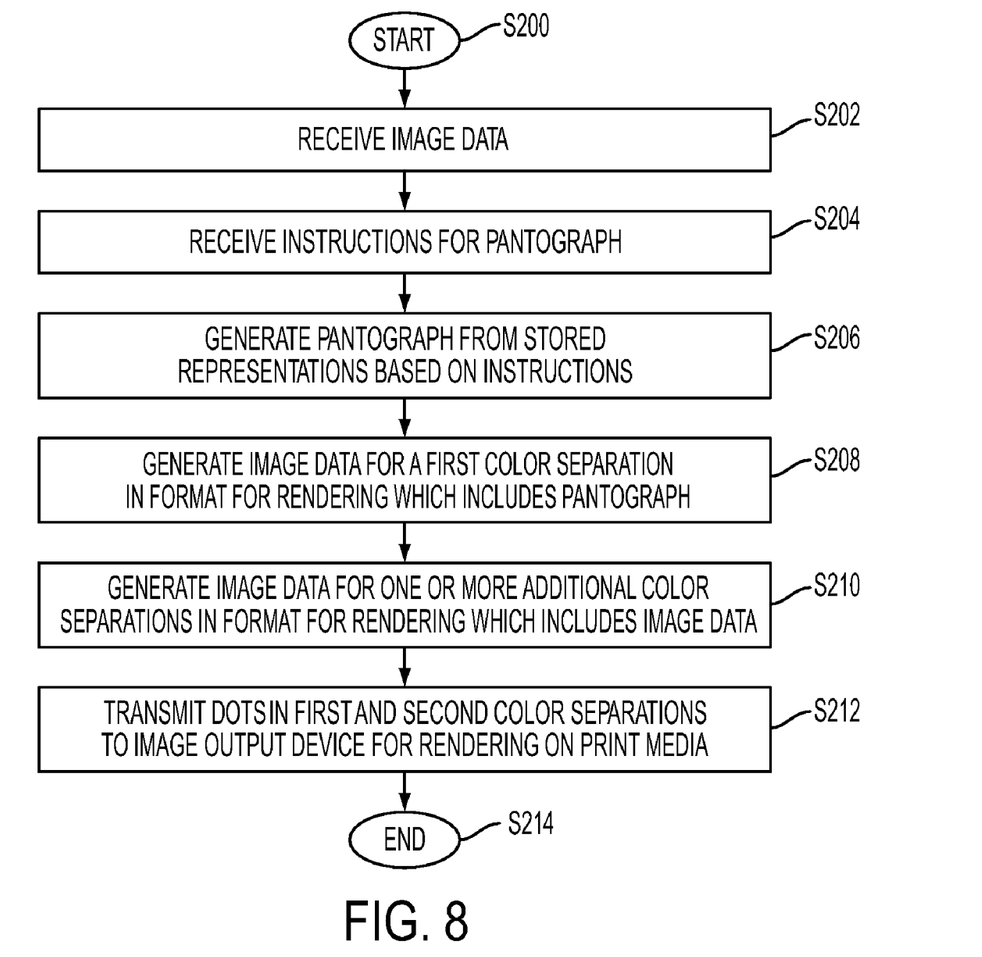
FIG. 8 illustrates a method for incorporating a pantograph in an original document, in accordance with a third aspect of the exemplary embodiment.

FIG. 8 illustrates an exemplary method for creating an original document 50 incorporating a pantograph 12 in accordance with the exemplary embodiment. It should be appreciated that the method may include fewer, more or different steps and that the steps of the exemplary method need not be performed in the order shown. The method assumes that a set of character representations 10A, 10B, etc. have been generated for an entire vocabulary 74, e.g., by the method of FIG. 4, and stored in memory 72. In general, these preliminary steps are performed prior to receiving a request to generate an original document 50 and thus once performed do not need to be repeated for each original document 50 to be created. In other embodiments, however, they may be performed later.

The method begins at S200. At S202, an input image to be rendered is input to the processor 88. For example, a digital image file which includes one or more digital images, such as image 76, is received by the printing apparatus 70, e.g., in the form of a print job. The file may be received via a network, e.g., from the networked computer 90 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. Alternatively, the file may be input to a computing device separate from the printer, on which the processor 88 is located, or retrieved from an image data storage device by that computing device.

At S204, information 80 for generating a pantograph 12 is input. For example, instructions 80 are received by reception component 78. The instructions may include a data string, such as a group of characters, which is to be incorporated into the image as a pantograph.

At S206, character representations 10 are retrieved from memory 72 in accordance with the information 80 and assembled to form a pantograph 12.

At S208, a binary image is generated for the color separation to be used for the variable data pantograph, together with any image data selected for that color separation.

At S210, color binary image(s) for other color separation(s) to be used for the image data are generated. At the end of step S210, the entire image 98 (image data 76 and pantograph 12) has been processed in a suitable format for rendering, e.g., as halftone dots.

At step S212, the halftoned or otherwise processed image 98 incorporating the embedded pantograph 12 and primary image data 76 is submitted to the output device 86, where it is printed (e.g., with inks, toners or other marking material) on a blank print media substrate 52 to form an original image document 50. The method ends at S214.

The computer implemented steps of the method illustrated in FIGS. 3 and/or 8 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary methods disclosed herein may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 3 and/or 8, can be used to implement the methods for creation of character representations 10 and for embedding pantographs 12 in an original document.

Regarding the application of distinct GCR/UCR strategies to the background and foreground regions associated with the pantograph, the exemplary embodiments described herein simply state applying a first GCR/UCR strategy to the background region associated with the pantograph and applying a second GCR/UCR strategy to the foreground region. By way of example, this may include, but is not limited to, applying a first GCR to the background region which replaces relatively more colorants, e.g., CMY, with black, then a second GCR strategy to the foreground regions which applies no or relatively less black Conversely, relatively more black may be printed in foreground, while no or relatively less black may be used in background.

In experiments comparing the digitally generated pantographs with those formed by preprinting paper with a predetermined analog pantograph which is used for applying an image thereto, the digitally created pantograph performed well.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of rendering a pantograph on a printing device including one or more colorants comprising:
   a) defining a foreground region associated with the pantograph, the foreground region defining a pattern associated with one or more characters;
   b) defining a background region associated with the pantograph, the background region suitably sized and arranged for encompassing the foreground region;

c) selecting a target color for rendering the foreground region and background region of the pantograph, and generating a first color space representation of the target color, the first color space representation associated with the one or more colorants;

d) applying a first UCR/GCR strategy to the background region for rendering the target color within the background region using the one or more colorants, and applying a second UCR/GCR strategy to the foreground region for rendering the target color within the foreground region using the one or more colorants, whereby the foreground region is less discernable by a naked eye after the pantograph is rendered with the printing device relative to a reproduction by a copier of the pantograph rendered with the printing device, the copier including a scanner which scans the pantograph in a second color space, distinct from the first color space, whereby the reproduction includes the foreground region discernable by the naked eye; and e) rendering the foreground region and background region on the printing device.

2. The method of claim 1, wherein the first color space is one of Lab, CMY and CMYK, and the second color space is RGB.

3. The method of claim 1, wherein the first UCR/GCR strategy replaces relatively more colorants with black than the second UCR/GCR strategy.

4. The method of claim 1, wherein the first UCR/GCR strategy replaces relatively less colorants with black than the second UCR/GCR strategy.

5. The method of claim 1, wherein step d) comprises:
rasterizing the pantograph to define a pixel grid of on and off pixels;
applying the first UCR/GCR strategy to on pixels in the grid; and
applying the second UCR/GCR strategy to off pixels in the grid.

6. The method of claim 1, wherein step d) comprises:
rasterizing the pantograph to define a pixel grid of on and off pixels;
applying the first UCR/GCR strategy to off pixels in the grid; and
applying the second UCR/GCR strategy to on pixels in the grid.

7. The method of claim 1, wherein the first UCR/GCR strategy is relatively more black replacement, relative to the second UCR/GCR strategy which is relatively less black replacement.

8. The method of claim 1, wherein the first UCR/GCR strategy is relatively less black replacement, relative to the second UCR/GCR strategy which is relatively less black replacement.

9. The method of claim 1, step d) comprising:
rasterizing the pantograph at a reduced resolution;
applying the first UCR/GCR strategy to the background region for rendering the target color within the background region; and
applying the second UCR/GCR strategy to the foreground region for rendering the target color within the foreground region; and
step e) comprising:
rendering the foreground region and background region on the printing device at full resolution.

10. A printing system comprising:
a marking engine including one or more colorants; and
one or more controllers operatively connected to the one or more image marking engines, wherein at least one controller or at least one image marking engine or a combination of at least one controller and at least one image marking engine is configured to perform a method of rendering a pantograph on the marking engine comprising:

a) defining a foreground region associated with the pantograph, the foreground region defining a pattern associated with one or more characters;

b) defining a background region associated with the pantograph, the background region suitably sized and arranged for encompassing the foreground region;

c) selecting a target color for rendering the foreground region and background region of the pantograph, and generating a first color space representation of the target color, the first color space representation associated with the one or more colorants;

d) applying a first UCR/GCR strategy to the background region for rendering the target color within the background region using the one or more colorants, and applying a second UCR/GCR strategy to the foreground region for rendering the target color within the foreground region using the one or more colorants, whereby the foreground region is less discernable by a naked eye after the pantograph is rendered with the one or more marking engines relative to a reproduction by a copier of the pantograph rendered with the marking engine, the copier including a scanner which signs the pantograph in a second color space distinct from the first color space, whereby the reproduction includes the foreground region discernable by the naked eye; and e) rendering the foreground region and background region on the one or more marking engines.

11. The printing system according to claim 10, wherein the first color space is one of Lab, CMY and CMYK, and the second color space is RGB.

12. The printing system according to claim 10, wherein the first UCR/GCR strategy replaces relatively more colorants with black than the second UCR/GCR strategy.

13. The printing system according to claim 10, wherein the first UCR/GCR strategy replaces relatively less colorants with black than the second UCR/GCR strategy.

14. The printing system according to claim 10, wherein step d) comprises:
rasterizing the pantograph to define a pixel grid of on and off pixels;
applying the first UCR/GCR strategy to on pixels in the grid; and
applying the second UCR/GCR strategy to off pixels in the grid.

15. The printing system according to claim 10, wherein step d) comprises:
rasterizing the pantograph to define a pixel grid of on and off pixels;
applying the first UCR/GCR strategy to off pixels in the grid; and
applying the second UCR/GCR strategy to on pixels in the grid.

16. The printing system according to claim 10, wherein the first UCR/GCR strategy is relatively more black replacement, relative to the second UCR/GCR strategy which is relatively less black replacement.

17. The printing system according to claim 10, wherein the first UCR/GCR strategy is relatively less black replacement, relative to the second UCR/GCR strategy which is relatively less black replacement.

18. The printing system according to claim 10, step d) comprising:

rasterizing the pantograph at a reduced resolution;
applying the first UCR/GCR strategy to the background region for rendering the target color within the background region; and
applying the second UCR/GCR strategy to the foreground region for rendering the target color within the foreground region; and
step e) comprising:
rendering the foreground region and background region on the printing device at full resolution.

19. A non-transitory computer program product comprising:
a computer-usable data carrier storing instructions that, when executed by a computer, cause the computer to perform a method of rendering a pantograph on a printing device including one or more colorants, the method comprising:
receiving a data representation of a pantograph, the pantograph including a foreground region defining a pattern associated with one or more characters and a background region suitably sized and arranged for encompassing the foreground region;
generating a first color space representation of a target color, the first color space representation associated with the one or more colorants; and
applying a first UCR/GCR strategy to the background region for rendering a target color within the background region using the plurality of colorants, and applying a second UCR/GCR strategy to the foreground region for rendering the target color within the foreground region using the one or more colorants, whereby the foreground region is less discernable by a naked eye after the pantograph is rendered with the printing device relative to a reproduction of the pantograph rendered with the printing device, the copier including a scanner which scans the pantograph in a second color space, distinct from the first color space, whereby the reproduction includes the foreground region discernable by the naked eye.

20. The computer program product according to claim 19, wherein the first color space is one of Lab, CMY and CMYK, and the second color space is RGB.

* * * * *